United States Patent Office 3,062,637
Patented Nov. 6, 1962

3,062,637
COLLOIDAL CLAY BONDED AGRICULTURAL
GRANULE
James O. Marples, Rahway, and Edgar W. Sawyer, Jr.,
Metuchen, N.J., assignors to Minerals & Chemicals
Philipp Corporation, a corporation of Maryland
No Drawing. Filed June 12, 1958, Ser. No. 741,459
6 Claims. (Cl. 71—2.4)

The instant invention relates to an improvement in a class of granules useful for agricultural purposes, which granules comprise an aggregate of a particulate mineral carrier and an active agricultural ingredient such as a plant nutrient element, a herbicide, an algicide, an insecticidal toxicant or mixtures thereof. More specifically, the instant invention relates to such agricultural granules in which a novel binder is employed.

In recent years it has been recognized that many important advantages are realized by supplying plant nutrients, herbicides, algicides, and/or insecticidal toxicants to a site which may be crops, weeds, or swamp area, in the form of pellets or granules of appropriate size utilizing as a carrier for the active ingredient a particulate mineral which is substantially inert towards the active ingredient. Such granules may be in pellet or angular shape and may be adapted for aerial, manual or mechanical distribution to the intended site. Such granules must be sufficiently hard to resist attrition both during the processing of said granules and during the handling and use thereof yet permit release of the active ingredient at a suitable rate.

Hard granules have been successfully prepared heretofore when the active ingredient was of such a character as to permit its impregnation on a hard, preferably sorptive carrier such as calcined diatomaceous earth or calcined attapulgite; however, only when the active ingredient is used in trace amounts and/or has high water solubility are impregnation techniques feasible.

When, however, the active ingredient is only slightly soluble in water and/or is otherwise utilized in such proportion in the granule that it may not be successfully impregnated on the carrier granule in active proportion, impregnation techniques are not suitable. In such cases, the active ingredient may be formed into a substantially homogeneous mix with a particulated mineral which is essentially inert toward the active ingredient and the mixture is then formed into granules of aggregated composition, typically by pilling or by granulating in a drum. Such granules may include active ingredients in amount substantially in excess of that which can be successfully and/or economically impregnated on an equivalent weight of mineral carrier.

However, granules thus made suffer from the serious disadvantage of having low resistance to attrition. During the drying, handling, and field use of the granules considerable fines are produced, such fines usually representing a serious economic loss and in some instances a health hazard. Accordingly, binders have been used for such granules. Prior art binders have been water soluble or dispersible material, such as, for example, sodium carboxymethyl cellulose and various gums of natural origin.

Although such binders improve somewhat the hardness of the finished aggregated granule, at least two disadvantages are attendant their use. Firstly, said water soluble or dispersible binders tend to cause the granule to break down and disintegrate rapidly when the granule is wet or subjected to high environmental moisture. Rapid breakdown results in a too rapid release of the active ingredient, which in the case of most plant food nutrients, toxicants, herbicides and algicides is very serious since severe damage to susceptible vegetation may result. A second disadvantage of prior art binders is that they have little or no ability to act as carriers for the active ingredient in the granule since they contribute little or nothing to the effective surface area of the carrier.

Accordingly, it is a principal object of the subject invention to provide an active agricultural ingredient in granular form; the granules being characterized by outstanding attrition resistance and resistance to accelerated breakdown in the presence of water.

A further object of the invention is the provision in granular form of an aggregate of an active agricultural ingredient and an inert mineral carrier, the binder for said granule being one that functions in said granule as a portion of the mineral carrier.

Another object of the invention is the provision in granular form of an aggregate of a poorly soluble active agricultural ingredient and a sorptive mineral carrier therefor, the granules being characterized by outstanding hardness and resistance to rapid disintegration in the presence of water.

Another and more specific object of the invention is the provision in hard granular form of an aggregate of an active agricultural ingredient and a mineral carrier therefor wherein said active agricultural ingredient is present substantially in excess of that which can be readily impregnated on the carrier and in which a portion of the mineral carrier functions as a binder for the granule.

A further important object of the invention is the provision of such granules in which the release rate of active agricultural ingredients therefrom can be controlled without sacrifice in other desirable properties of the granules.

Another object of the invention is the provision of such granules which employ a binder which does not lose its ability to function as such in the presence of relatively high humidity encountered in storage.

Another object of the invention is the provision of an aggregated agricultural granule in which the constituents of the mineral carrier for the active agricultural ingredient conjointly contribute to the attrition resistance of the granule.

These and further advantages are realized in accordance with the subject invention by providing in granular form an intimate admixture or aggregate of an active agricultural ingredient, a particulate noncolloidal mineral carrier and a colloidal clay as the binder for the aggregate. We have found that agricultural granules made by pelletizing or otherwise granulating an active agricultural ingredient, a particulate mineral and a colloidal clay binder have remarkably improved resistance to breakage over that of granules made in the absence of said binder, whereby losses as fines during drying, handling and field use of the granules are considerably minimized. By adjustment of the ratio of colloidal to noncolloidal mineral control of the rate of release of active ingredient from the product in the presence of water may be achieved, since such release is a function of granule breakdown. All other influencing factors remaining constant, the release rate of active ingredient increases with increments in the ratio of noncolloidal to colloidal clay.

Furthermore, we have found that the rapid disintegration in water which characterizes granules bound by carboxymethyl cellulose, gums and other prior art binders is obviated by use of the colloidal clay. A further and important advantage realized is that the colloidal clay functions not only as a binder but as an effective carrier because of the high surface area of the mineral whereby larger quantities of active agricultural ingredients may be effectively carried than when equivalent quantities of prior art binders are used.

The term "granules" as used herein refers to particles typically within the size range of from about ½-mesh to 100-mesh and encompasses spheres, cylinders or irregular angular shapes. However, somewhat larger and smaller particles are within the compass of our invention.

Stated briefly, compositions of the instant invention comprise in granular form an admixture of an active agricultural ingredient and a sorptive mineral carrier, a portion of said carrier being a sorptive colloidal clay selected from the group consisting of colloidal attapulgite and colloidal sepiolite, which colloidal clay performs the additional and important purpose of effectively binding into a coherent mass the components of the pellet. The pellet is prepared by forming a homogeneous mixture of the components including the colloidal clay and water and pelletizing or otherwise forming shaped masses of appropriate size.

More specifically, in accordance with the instant invention at least one sorptive gel-forming clay selected from the group consisting of colloidal attapulgite and colloidal sepiolite is used in binder-effective quantity to replace a portion of a particulate sorptive mineral used as a carrier for an active agricultual ingedient in an agricultural granule of the type in which an active agricultural ingredient is admixed with and dispersed throughout a particulate mineral carrier (as opposed to an agricultural granule in which the active ingredient is impregnated on the granule).

Clay minerals are essentially hydrous aluminosilicates with magnesium or iron proxying wholly or in part in some of the aluminum and with alkalies or alkaline earths present as constituents in some of them. Sepiolite, sometimes called "meerschaum" is a fibrous, gel-forming clay mineral in its uncalcined state and has a formula considered by some mineralogists to be essentially $$4H_2O \cdot 2MgO \cdot 3SiO_2$$

Its properties resemble closely those of attapulgite (sometimes called Georgia-Florida fuller's earth) and it has a somewhat similar composition and crystal lattice with a principal exception that in attapulgite there is considerable replacement of magnesium in the lattice by aluminum.

Attapulgite and sepiolite, as mined or as variously processed to eliminate grit and coarse associated material, have the ability to form a gel in water when dispersed therein at relatively low solids content. This gel-forming property is modified or destroyed substantially when the free moisture content is reduced below a critical level, usually about 5% in the case of attapulgite, free moisture being the weight percent of the mineral eliminated by heating the mineral to essentially constant weight at about 220° F. When these clay minerals are calcined at an elevated temperature, usually within the range of from about 600° F. to 1000° F., substantial water of hydration is lost and the hardness of the mineral is improved substantially. Also, the gel-forming properties of the clays are virtually completely destroyed during the calcination, such treatment being termed "activation." The activation of attapulgite is described in detail in an article appearing in Industrial and Engineering Chemistry, vol. 42, page 529 (1950), by W. S. W. McCarter et al. and entitled "Thermal Activation of Attapulgus Clay."

It will be understood that, as used herein, "colloidal clay" refers to clay which has the ability to form a gel when dispersed in water at low solids concentration, e.g. 10 percent, whereas activated clay is clay calcined in a suitable manner to eliminate gel-forming properties and to develop hardness and reduce tendency to shrink during drying.

The amount of colloidal clay that is employed in compositions of the instant invention is usually within the range of from about 2 to 50%, based on the total weight of the mineral carrier (V.F. basis). V.F. or "volatile free" weight is determined by heating the mineral to essentially constant weight at about 1800° F. V.M. or "volatile matter" is the weight percentage of a mineral eliminated by heating to essentially constant weight at 1800° F. The colloidal clay is preferably used in its raw state after degritting, when necessary, although it may be mildly dried to a suitable volatile matter content at which the gel-forming properties are not impaired. Ordinarily the free moisture content of the colloidal clay is within the range of from about 5 to 30%.

The primary carrier is a hard mineral which has excellent sorptivity and minimal tendency to shrink during drying, activated diatomaceous earth, activated sepiolite and activated attapulgite being examples of preferred primary carriers. Diatomaceous earth may be activated by thermal treatment at temperatures usually within the range of from about 1200–2000° F. The activation of attapulgite has been described above. The primary carrier may contain, in addition to the hard, highly sorptive mineral such as activated attapulgite or diatomaceous earth, diluents such as limestone, talc, kaolin clay, gypsum or pyrophyllite. However, when it is not required that the primary carrier have high sorptivity, the minerals hereinabove specified as diluents may be used, either singly or in admixture, as the primary carrier. However, in most instances either activated diatomaceous earth or activated attapulgite or mixtures therebetween will be preferred since their sorptivity may be exploited to permit larger quantities of active agricultural ingredients than may be utilized when less sorptive primary carriers are used. It may be noted, however that because of the sorptivity of the secondary carrier, i.e., the colloidal clay binder, the importance of high sorptivity of the primary carrier may in some instances be negated somewhat and, accordingly, certain carrier minerals of moderate sorptivity may be used to carry quantities of active agricultural ingredients heretofore not feasible.

Sepiolite and attapulgite are unique among clay minerals because of their high sorptivity for water and a variety of organic substances and by the unique lath-like or acicular structure of the ultimate crystalline particles of the mineral. Accordingly, in compositions of our invention in their colloidal or gel-forming state they contribute in two broad ways to the outstanding properties of the granules compositions in which they are employed. Firstly, by virtue of their sorptivity they increase substantially the amount of active ingredient that can be used when utilizing prior art binders of low surface area. Secondly, they impart outstanding hardness to the granules, this outstanding hardness being considered to be the result of interknitting of the mineral laths with one another and with the particulate mineral composing the other portion of the carrier. The non-colloidal mineral of the type hereinabove specified functions as the primary carrier for the active ingredient and, because of its substantial lack of shrinkage during drying of granules processed therewith, contributes a hardness and coherency to the pellet which would not be realized if the colloidal clay were to be used as the sole carrier.

The active agricultural ingredients that we intimately admix with the mineral carrier to form an aggregate in granular form may encompass a variety of functions and compositions, used singly or in admixture, and may be liquid or solid. In general, it may be said that maximum benefits of intimately incorporating the active agricultural ingredient with the carrier prior to formation of granules are realized when the solubility of the active ingredient in inexpensive solvents is poor or where large quantities of such active agricultural ingredients are included in the granule. Typical of classes of materials encompassed by the term active "agricultural ingredient" are insecticidal toxicants, herbicides and algicides and plant food nutrients. Among insecticidal toxicants may be mentioned DDT, chlordane, calcium arsenate and lead arsenate. Herbicides and/or algicides may be from the chlorinated phenoxyacetic acid group, e.g., sodium and amine salts of 2,4-D, 4-chloro-2-methylphenoxyacetic acid and its esters, 2-4-dichlorophenoxyacetic acid and its esters, 2,4,5-trichlorophenoxyacetic acid and its esters;

also 1-chloro-3,5-diethylamino triazine, 3-(3,4-dichlorophenyl)-1,1-dimethyl urea, 2,4-dinitro-6-sec.-butylphenol and 1,3-bis(2,2,2-trichloro-1-hydroxyethyl)urea. Difficultly soluble plant food nutrients such, for example, as are applied to crops to supply trace elements of metallic nutrients may be used as the active agricultural ingredient; as examples may be cited iron and copper chelates. Other plant food nutrients may include minor elements such as salts, oxides or complexes of Mn, B, Ca, Co, Mg, Zn, etc.

Granules within the compass of our invention are suitably made by mixing to apparent homogeneity appropriate proportions of water and other suitable volatile vehicle, active agricultural ingredient, non-colloidal sorptive mineral and colloidal clay binder, adjusting the volatile matter content to extrudable consistency, extruding the mixture, cutting pellets from the extrudate, drying the pellets to eliminate therefrom excessive moisture and, if so desired, grinding the pellets to provide granules of appropriate size. The mixing may be performed in any suitable apparatus, a pug mill being particularly satisfactory for the purpose. In some instances extruding the mix under vacuum will improve the physical properties of the granular product. Drying should be controlled to prevent the decompositional effects of heat from destroying the efficacy of the particular active agricultural ingredient.

It will be understood, however, that the granules may be formed by other means, such as molding or by granulation methods involving feeding a slurry of particulate mineral into a rotary dryer which abstracts moisture and simultaneously accumulates particles into small granules, usually somewhat spherical in form. Granulations may also be carried out by spraying water onto the mineral in a rolling drum whereby during rolling small spheres are formed.

The following examples are given to contribute to a better understanding of the invention and are not to be considered as limiting the scope of the invention thereto.

*Example I*

This example illustrates the improvement in hardness of extruded herbicidal granules resultant from replacing a portion of the calcined mineral carrier with colloidal clay. In the example highly concentrated EPN granules were prepared, in sample (A) the pellets consisting of EPN intimately admixed with calcined attapulgite as the sole carrier; in the other sample, (B), the granules consisted of an equivalent amount of EPN intimately admixed with an attapulgite carrier in a quantity substantially equal to that in granules (A) but in which 5% of the total attapulgite was colloidal attapulgite.

Granules were prepared from the following mixtures by admixing the components to apparent homogeneity, extruding the mixture through a die plate, cutting the extrudate into pellets, drying the pellets at 225° F. to a F. M. of less than 5%, grinding the pellets in a roller mill, and screening to obtain an 8/15-mesh product.

|  | A | B |
|---|---|---|
|  | Parts by Wt. | Parts by Wt |
| Attaclay | 1,500 | 1,425 |
| Attasol |  | 75 |
| 25% EPN | 60 | 60 |
| Water | 150 | 150 |

EPN is ethyl-p-nitrophenyl thionobenzene phosphonate. Attaclay is calcined noncolloidal attapulgite (15% V.M.). Attasol is colloidal attapulgite (22% V.M.). Although both formulations produced hard pellets, pellets (B) were considerably harder and showed less of a tendency to break down into fines during processing.

Formulation (A) was duplicated by a conventional impregnation technique involving slurrying the EPN in water, dripping the slurry onto 8/15-mesh Attaclay (calcined attapulgite) and drying the granules. The product was a dusty friable mass.

*Example II*

Another herbicidal pellet of our invention was prepared by pelletizing by an extrusion technique an admixture of Simizin powder (1-chloro-3,5-diethylaminotriazine), calcined attapulgite, raw degritted attapulgite and water. The formulation for the pelleted product was as follows, wherein the clay weights include volatile matter remaining after heating the clays at 225° F. to constant weight.

Parts by wt.
Simizin 50W (50% Simizin on CaCO₃) _____ 20
Attaclay _____ 72
Raw attapulgite _____ 8

In the preparation of the pellets the noncolloidal clay (Attaclay) was dry mixed in a ribbon blender with the calcium carbonate extended herbicide. The dry admixture was pugged with a 10% slurry of raw attapulgite and water sufficient to provide an extrudable admixture. The admixture was extruded under 25 lbs. average vacuum through 0.185-inch holes with a 0.25-inch land. Pellets were cut from the extrudate and the pellets dried at 225° F. to a free moisture content of 3%. The dried pellets were ground in a roller mill and screened to obtain a 15/30-mesh product.

The granular product was tested for hardness by a test method hereinafter described and was found to have a hardness value of 36. Attaclay, 15/30-mesh, had a hardness value of 13 by the method. An extrudate, prepared using Simizin powder, 20 parts by weight, Attaclay, 80 parts by weight and no raw attapulgite was too soft to be granulated or to be measured for hardness by the test method.

In this example comparative hardness of granular products was evaluated by abrading a pre-screened granular product under controlled conditions and thereafter measuring the percentage of material retained on a limiting screen. The procedure was as follows. Test granules were screened on a 30-mesh sieve (Tyler 8-inch testing sieve) to eliminate fines. Fifty grams of the material which was retained on the limiting screen was transferred to the pan of the Tyler sieve assembly, 10–⅝-inch steel balls placed in the pan with the sample to be tested and the limiting screen placed in position above the pan. The assembly was then inverted on a Ro-Tap sieve shaker, adapted to impart an oscillatory motion to the assembly, and the shaker run for five minutes. To measure the amount of abrasion which took place the steel balls were removed from the pan and a screen analysis run on the abraded sample utilizing the Ro-Tap shaker. Hardness was calculated as the percentage of charged 30-mesh sample retained on the 30-mesh screen after controlled abrasion.

It will be understood that the invention as hereinabove described is susceptible to numerous variations without departing from the spirit and scope thereof. For example, to prevent sinking of the granules provided in accordance with our invention, surfactants may be intimately associated with the surface of the granules, either by dusting of the surfactant onto the surface of the granule or by spraying or otherwise impregnating a solution of the surfactant on the surface of the granule. If the efficacy of the particular agricultural ingredient is enhanced by the conjoint effect of a surfactant, a suitable surfactant may be included in the aggregated granule. Furthermore, combinations of compatible agricultural ingredients may be present in the granules where such combination serves a useful purpose.

We claim:
1. A solid agricultural composition consisting of granules comprising an apparently homogeneous mixture of particles of a solid mineral carrier and at least one active agricultural material selected from the group con- sisting of a herbicide, an algicide, a trace plant food element and an insecticidal toxicant, said active material being present in said mixture in an amount in excess of that which can be impregnated on said carrier, said carrier comprising a mixture of particles of a sorptive siliceous mineral selected from the group consisting of calcined attapulgite clay, calcined sepiolite clay and calcined diatomaceous earth and from 2 to 50 percent, based on the volatile free weight of said carrier, of a sorptive clay binder material selected from the group consisting of attapulgite clay and sepiolite clay, which clay contains substantially all of its water of hydration and has a free moisture content of at least 5 percent by weight.

2. The composition of claim 1 in which said clay binder material is raw attapulgite clay.

3. A solid concentrated weed-killing composition consisting of granules comprising an apparently homogeneous mixture of particles of a solid mineral carrier and particles of a herbicide, said herbicide being present in an amount in excess of that which is able to be impregnated on said carrier, said carrier comprising a mixture of particles of a sorptive siliceous mineral selected from the group consisting of calcined attapulgite clay, calcined sepiolite clay and calcined diatomaceous earth and from 2 to 50 percent, based on the volatile free weight of said carrier, of attapulgite clay which contains substantially all of its water of hydration and has a free moisture content of at least 5 percent.

4. A solid concentrated weed-killing composition consisting of granules comprising an apparently homogeneous mixture of particles of a solid mineral carrier and particles of a herbicide, said herbicide being present in an amount in excess of that which is able to be impregnated on said carrier, said carrier comprising calcined diatomaceous earth and from 2 to 50 percent, based on the volatile free weight of said carrier, of attapulgite clay which contains substantially all of its water of hydration and has a free moisture content of at least 5 percent.

5. A solid concentrated weed-killing composition consisting of granules comprising an apparently homogeneous mixture of particles of a solid mineral carrier and particles of a herbicide, said herbicide being present in an amount in excess of that which is able to be impregnated on said carrier, said carrier comprising calcined attapulgite clay and from 2 to 50 percent, based on the volatile free weight of said carrier, of attapulgite clay which contains substantially all of its water of hydration and has a free moisture content of at least 5 percent.

6. A solid concentrated weed-killing composition consisting of granules comprising an apparently homogeneous mixture of particles of a solid mineral carrier and particles of a herbicide, said herbicide being present in an amount in excess of that which is able to be impregnated on said carrier, said carrier comprising attapulgite clay which has been calcined at a temperature within the range of 600° F. to 1000° F. and from 2 to 50 percent, based on the volatile free weight of said carrier, of raw attapulgite clay.

References Cited in the file of this patent

UNITED STATES PATENTS

| | | |
|---|---|---|
| 2,444,154 | Cross | June 29, 1948 |
| 2,695,839 | Kenny et al. | Nov. 30, 1954 |
| 2,695,840 | Leppla | Nov. 30, 1954 |
| 2,700,604 | Knight | Jan. 25, 1955 |
| 2,760,900 | Glenn et al. | Aug. 28, 1956 |
| 2,792,295 | Wright | May 14, 1957 |
| 2,806,773 | Pole | Sept. 17, 1957 |
| 2,971,292 | Maleck | Feb. 14, 1961 |